United States Patent [19]

Schultz

[11] Patent Number: 4,962,417
[45] Date of Patent: Oct. 9, 1990

[54] CHROMA OVERLOAD DETECTOR USING A DIFFERENTIAL AMPLIFIER

[75] Inventor: Mark A. Schultz, New Palestine, Ind.
[73] Assignee: RCA Licensing Corporation, Princeton, N.J.
[21] Appl. No.: 193,549
[22] Filed: May 12, 1988
[51] Int. Cl.$^5$ .............................................. H04N 9/68
[52] U.S. Cl. ...................................... 358/27; 358/40; 307/362
[58] Field of Search .......................... 358/27, 35, 40; 328/146, 148; 307/350, 351, 362, 363

[56] References Cited

U.S. PATENT DOCUMENTS

| | | | |
|---|---|---|---|
| 3,740,462 | 6/1973 | Harwood | 178/5.4 |
| 3,764,734 | 10/1973 | Srivastava et al. | 178/5.4 |
| 3,867,685 | 2/1975 | Ahmed | 323/4 |
| 3,877,067 | 4/1975 | Furrey | 358/27 |
| 3,962,723 | 6/1976 | Srivastava | 358/27 |
| 4,054,905 | 10/1977 | Harwood et al. | 358/27 |
| 4,106,054 | 8/1978 | Tzakis | 358/27 |
| 4,106,055 | 8/1978 | Burdick et al. | 358/27 |
| 4,197,557 | 4/1980 | Tuma et al. | 358/34 |
| 4,349,834 | 9/1982 | Tonomura et al. | 358/27 |
| 4,630,102 | 12/1986 | Wargo et al. | 358/27 |

FOREIGN PATENT DOCUMENTS

| | | |
|---|---|---|
| 192195 | 8/1986 | Japan . |
| 196689 | 8/1986 | Japan . |
| 13193 | 1/1987 | Japan . |
| 43992 | 2/1987 | Japan . |
| 72281 | 4/1988 | Japan . |
| 72282 | 4/1988 | Japan . |

*Primary Examiner*—James J. Groody
*Assistant Examiner*—Robert M. Bauer
*Attorney, Agent, or Firm*—Joseph S. Tripoli; Peter M. Emanuel; Thomas F. Lenihan

[57] ABSTRACT

In a color television receiver having first and second chroma amplifiers, a chroma overload detector uses a differential amplifier for peak detection of a chrominance signal over a predetermined threshold level, and in response thereto, for generating a control signal and applying it to the second chroma amplifier to control the gain of the amplifier.

10 Claims, 2 Drawing Sheets

CHROMA OVERLOAD DETECTOR USING A DIFFERENTIAL AMPLIFIER

FIELD OF THE INVENTION

This invention relates generally to the field of television color signal processing circuitry and specifically to the field of chroma overload detector circuitry.

BACKGROUND OF THE INVENTION

The term "kine" as used herein means color television picture tube.

In order to prevent objectionable variations in the level of the chrominance signals displayed on the screen of a color television receiver, it is well known to employ an automatic chrominance control (ACC) circuit. ACC circuits typically operate in a closed loop configuration and vary the gain of a first chrominance amplifier in response to the amplitude of the color burst component of the received television signal.

The ACC circuitry will not function properly if the ratio of the burst amplitude to chrominance in the received television signal is incorrect. This incorrect ratio may be due to problems originating at the broadcaster's transmitter, or because of reflections of the signal along the signal path between the transmitter and television receiver. Such an incorrect ratio may cause an overload condition to occur. The response of the ACC circuitry is typically not fast enough to prevent an overload condition from being displayed on the screen. The overload may manifest itself as one or more television lines having an objectionably saturated color level which may resemble a smearing effect. In order to solve this problem, chroma overload circuitry is employed to detect an overload condition and control the gain of a second chrominance amplifier accordingly.

An example of chroma circuitry employing a chroma overload detector is known from U.S. Pat. No. 4,054,905(Harwood, et al.). While this circuitry performs well, it has certain features which may make it not optimally suited for integration in modern integrated circuits which tend to be more densely packed than those of a decade ago.

For example, the circuitry of Harwood, et al. requires a zener diode and a relatively large value resistor (approximately 40K ohms). Zener diodes are not readily available in the technology used in the design and manufacturing of today's densely packed integrated circuits, and because large value resistors require too much area, their use is to be avoided, if possible.

SUMMARY OF THE INVENTION

It is herein recognized that the above-noted problems inherent in prior chroma overload detectors can be eliminated by using a differential amplifier as a comparator in a chroma overload detector circuit. Specifically, the integrability of the circuit is enhanced in that a zener diode and large valued resistor are no longer necessary. It is additionally recognized that temperature variations are more easily compensated when a differential amplifier chroma overload detector is used because the other chroma processing stages utilize similar differential amplifier stages as well.

DETAILED DESCRIPTION OF THE DRAWING

Figure 1:
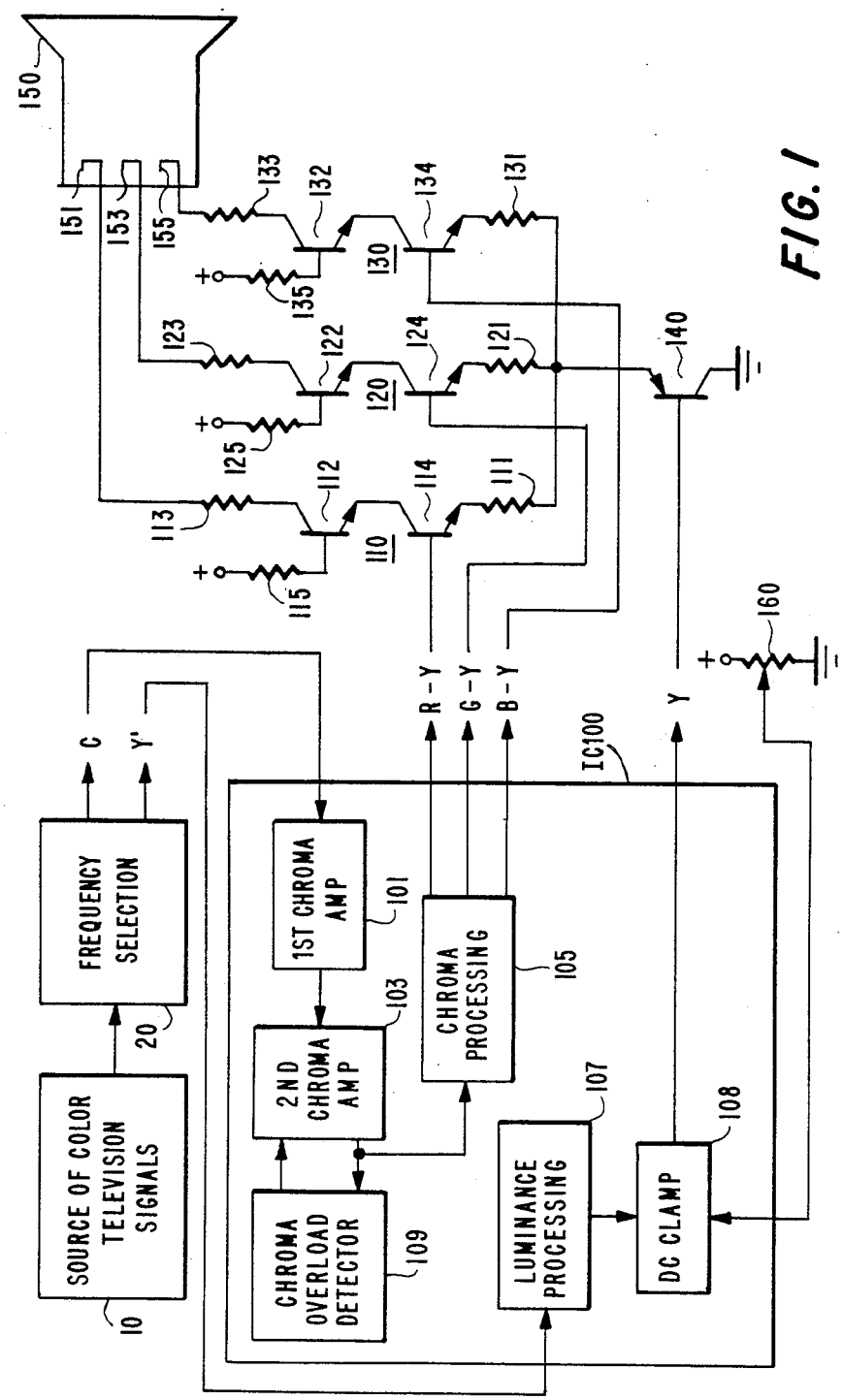
FIG. 1 shows, partly in block diagram form and partly in schematic diagram form, the portions of a television receiver which are relevant to the subject invention.

The portions of a television receiver relevant to the invention are shown in FIG. 1. A source of color television signals 10 supplies signal to a frequency selection unit 20 which separates chrominance signals C and unprocessed luminance signals Y' and applies them to a multifunction high density integrated circuit IC100. IC100 may also contain sound processing and deflection circuitry (not shown) which are not relevant per se to this invention.

Chrominance signals C are applied via a first chrominance amplifier (1st chroma amp.) 101 and a second chrominance amplifier (2nd chroma amp.) 103 to a chroma processing unit 105 which derives R-Y, G-Y, and B-Y signals therefrom. Unprocessed luminance signals Y' are applied to luminance processing unit 107, the output of which is clamped to the proper level by d.c. clamp 108, and applied to the base of luminance buffer amplifier 140. R-Y, G-Y and B-Y signals are applied to the input of kine driver amplifiers 110, 120 and 130 respectively.

Each of these kine drive amplifiers is arranged in a cascode configuration as is well known. Kine driver amplifiers 110, 120 and 130 comprise cascode-connected transistors 112 and 114, 122 and 124, and 132 and 134 respectively. Luminance signals are applied to the emitters of transistors 114, 124 and 134 via coupling resistors 111, 121 and 131. Amplified video signals are applied to the individual cathodes 151, 153, 155 of kine 150 via load resistors 113, 123 and 133 respectively. Base bias for transistors 112, 122 and 132 is provided by resistors 115, 125 and 135 respectively.

D.C. clamp 108 may be a keyed clamp of the type known from U.S. Pat. No. 4,197,557 (Tuma et al.) Specifically, it has an input terminal to which the wiper of a brightness control 160 is coupled. Manual operation of the brightness control affects the d.c. level of the luminance signal and thus the brightness of the picture displayed on kine 150.

The amplified chrominance signal produced by the second chrominance amplifier 103 is also applied to a chroma overload detector 109, the function of which will be explained in detail below.

The first chrominance amplifier 101 is gain controlled by automatic color control (ACC) circuitry, not shown. ACC circuitry is well known in the art from, for example, U.S. Pat. 3,740,462 (Harwood). Briefly, ACC circuitry is responsive to the color burst component of a color television signal and acts to maintain the amplitude of the burst information at the output of the first chrominance amplifier at a constant level. If each television broadcaster adheres to system standards concerning the relative levels of picture-chroma and burst information in its signals, the chroma signals will be maintained at the same color saturation level despite the viewer switching from one channel to another.

Chroma overload detector 109 responds to the amplitude of the chrominance signals at the output of the second chrominance amplifier 103, when the signals exceed a predetermined threshold level, by generating a gain control signal and applying it to the second chrominance amplifier 103 to reduce its gain.

Figure 2:
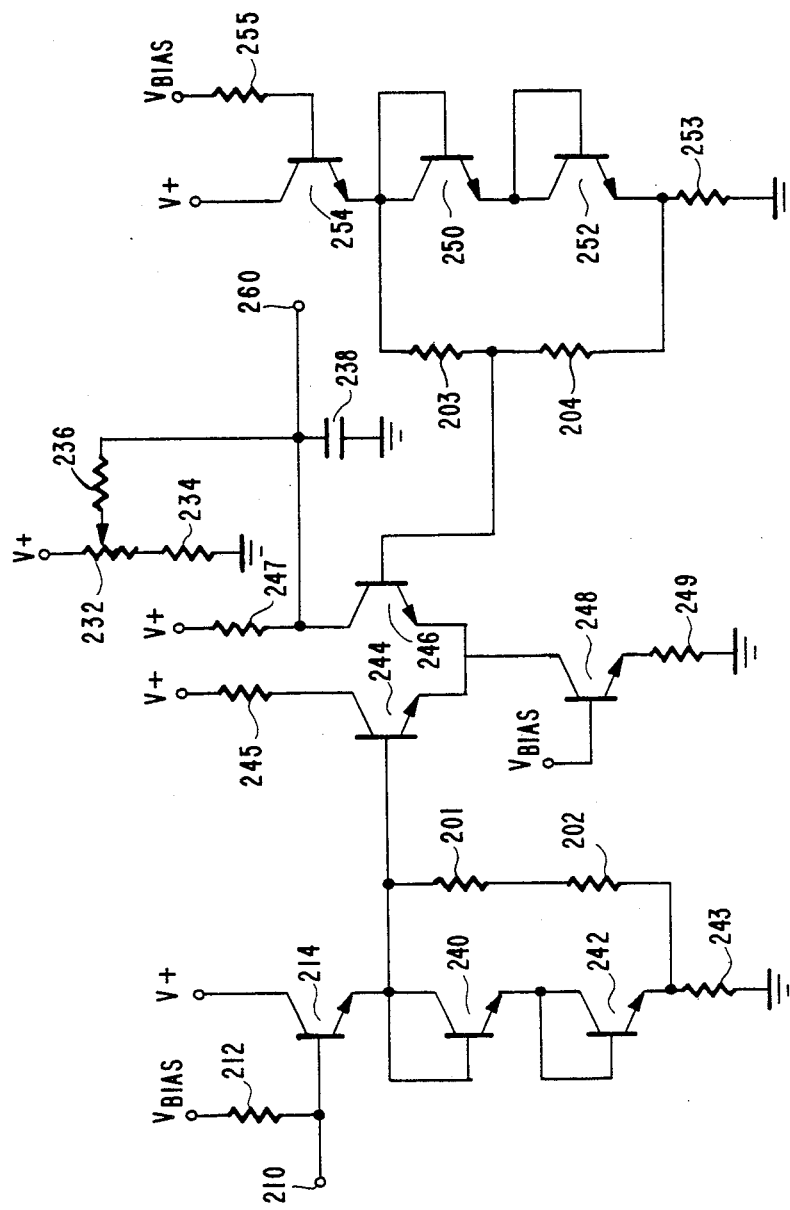
FIG. 2 shows in schematic diagram form an embodiment of the invention suitable for use in the television receiver of FIG. 1.

FIG. 2 shows in detail the chroma overload circuitry of element 109 of FIG. 1. The chroma overload detector comprises a differential amplifier including transistors 244 and 246 which have their respective emitters connected together and returned to ground via a current source transistor 248 and a resistor 249. The collectors of transistors 244 and 246 are coupled via load resistors 245 and 247, respectively, to a voltage source V+.

The chrominance signal input circuitry of the differential amplifier is provided by buffer amplifier transistor 214, and its base bias resistor 212. The emitter of transistor 214 is coupled to the collector of diode-connected transistor 240 which is in turn connected in series with another diode-connected transistor 242. Diode-connected transistor 242 is returned to ground via resistor 243. Two series-connected resistors 201 and 202 are connected in parallel with the series combination of diode-connected transistors 240 and 242.

The predetermined threshold level mentioned above is established by the circuitry coupled to the base of transistor 246. It should be noted that the circuitry of one-half of the differential amplifier essentially mirrors that on the other half with one important exception to be discussed below. Transistor 254 has an associated bias resistor 255 and has its emitter coupled to the collector of diode-connected transistor 250 which is in turn coupled in series with another diode-connected transistor 252. Diode-connected transistor 252 is returned to ground via resistor 253. Two series-connected resistors 203 and 204 are connected in parallel with the series combination of diode-connected transistors 250 and 252.

The important exception to the symmetry between the two sides of the differential amplifier is that the base of transistor 244 is connected to the top of the series pair of resistors 201 and 202, while the base of transistor 246 is connected to the connection point between resistors 203 and 204.

In order to properly balance the amplifier, the values of resistors 201 and 203 should be equal, the values of resistors 202 and 204 should be equal, and the values of resistors 243 and 253 should be equal. It is preferable that resistors 201, 202, 203, and 204 have values equal to each other, because in that case they could all use the same geometry, thereby making the physical layout of the integrated circuit containing them easier. It is the ratio of resistors 203 and 204 which sets the predetermined threshold level by forming a voltage divider across diode-connected transistors 250 and 252.

In operation, chrominance signals are applied to the base of transistor 214 and replicated on the base of transistor 244. Transistor 246 is biased at a lower level than is transistor 244, and is normally not conducting.

When the amplitude of the chrominance signals becomes sufficiently large, the negative excursions of the signal exceed the level necessary to cut off transistor 244 and allow transistor 246 to conduct. A d.c. output signal is developed at the collector of transistor 246 which relates to that portion of the amplitude of the chrominance signal which exceeds the predetermined threshold level. The output signal is filtered by elements 232, 234, 236 and 238 and applied via terminal 260 to the control input of the second chrominance amplifier 103 to reduce its gain.

What is claimed is:

1. A chroma overload detector, comprising:
   an input terminal for receiving chrominance signals;
   means for generating a predetermined threshold voltage level; and
   differential amplifier means having a first input coupled to said input terminal, a second input coupled to said threshold voltage level generating means, and an output;
   said differential amplifier means producing at said output an output voltage proportional to the difference between the magnitude of said chrominance signals and said threshold voltage level when said magnitude of said chrominance signals exceeds said threshold voltage level.

2. The chroma overload detector of claim 1, wherein said means for generating a predetermined threshold level comprises a voltage divider.

3. A chroma overload detector, comprising:
   an input terminal for receiving chrominance signals;
   means for generating a predetermined threshold voltage level; and
   differential amplifier means having a first input coupled to said input terminal, a second input coupled to said threshold voltage level generating means, and an output;
   said differential amplifier means producing at said output an output voltage proportional to the difference between the magnitude of said chrominance signals and said threshold voltage level when said magnitude of said chrominance signals exceeds said threshold voltage level; wherein
   said means for generating a predetermined threshold voltage level includes a voltage divider; and wherein
   said voltage divider includes a series connection of diode means.

4. The chroma overload detector of claim 3, wherein said diode means comprises a diode-connected transistor.

5. The chroma overload detector of claim 3, wherein said voltage divider further comprises resistor means connected in parallel with said diode means.

6. The chroma overload detector of claim 4 wherein said voltage divider further comprises resistor means connected in parallel with said diode-connector transistor.

7. A detector for detecting signals having a magnitude greater than a predetermined threshold level, comprising:
   an input terminal for receiving said signals;
   bias means for generating a first bias voltage at said threshold voltage level, and a second bias voltage having a predetermined magnitude other than said threshold voltage level; and
   differential amplifier means having a first input coupled to said bias means for receiving said first bias voltage at said threshold level, a second input coupled to said input terminal for receiving said signals and to said bias means for receiving said second bias voltage, and an output; wherein
   said differential amplifier means produces at said output an output voltage proportional to the difference between the magnitude of said signals and said first bias voltage at said threshold level when said magnitude of said signals exceeds said threshold level; and
   said bias means comprises a first series connection of diode means for developing said first bias voltage, and a second series connection of diode means for developing said second bias voltage.

8. The detector of claim 7 wherein said bias means further comprises first resistor means coupled in parallel with said first diode means, and second resistor means coupled in parallel with said second diode means.

9. The detector of claim 8 wherein the resistance of said first resistor means is substantially equal to the resistance of said second resistor means.

10. A detector for detecting signals having a magnitude greater than a predetermined threshold level, comprising:
an input terminal for receiving said signals;
bias means for generating a first bias voltage at said predetermined threshold level, and a second bias voltage having a predetermined magnitude other than said threshold voltage level; and
differential amplifier means having a first input coupled to said bias means for receiving said first bias voltage at said predetermined threshold level, a second input coupled to said input terminal for receiving said signals and to said bias means for receiving said second bias voltage, and an output; wherein
said differential amplifier means produces at said output an output voltage proportional to the difference between the magnitude of said signals and said first bias voltage at said threshold level when said magnitude of said signals exceeds said threshold level; and wherein
said first and second diode means comprise first and second diode-connected transistors.

* * * * *